United States Patent
Wen et al.

(10) Patent No.: US 9,184,672 B2
(45) Date of Patent: Nov. 10, 2015

(54) DC TO AC POWER CONVERSION WITH RESONANCE VALLEY DETECTION

(71) Applicant: Industrial Technology Research Institute, Hsinchu (TW)

(72) Inventors: Chau-Chun Wen, Hsinchu (TW); Ming-Hung Yu, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 161 days.

(21) Appl. No.: 13/939,916

(22) Filed: Jul. 11, 2013

(65) Prior Publication Data

US 2014/0185341 A1 Jul. 3, 2014

(30) Foreign Application Priority Data

Dec. 28, 2012 (TW) .............................. 101150917 A (51) Int. Cl.
*H02M 7/497* (2007.01)
*H02M 7/48* (2007.01)
(Continued)

(52) U.S. Cl.
CPC ........ *H02M 7/4807* (2013.01); *H02M 3/33592* (2013.01); *H02M 7/497* (2013.01); *H02M 2001/0058* (2013.01); *H02M 2001/0077* (2013.01); *H02M 2007/4815* (2013.01); *Y02B 70/1475* (2013.01); *Y02B 70/1491* (2013.01)

(58) Field of Classification Search
CPC ...................... H02M 2007/4815; H02M 7/483; H02M 7/49; H02M 7/487; H02M 2001/0058; H02M 2001/0077
See application file for complete search history.

(56) References Cited

U.S. PATENT DOCUMENTS 5,473,530 A  12/1995  Giuseppe et al.
6,807,072 B2  10/2004  Tanabe et al.
(Continued)

FOREIGN PATENT DOCUMENTS

CN  100448153 C  12/2008
CN  201430532 Y  3/2010
(Continued)

OTHER PUBLICATIONS

Chen, Yaow-Ming et al., Three-Port Flyback-Type Single-Phase Micro-Inverter With Active Power Decoupling Circuit, Energy Conversion Congress and Exposition, 2011, pp. 501-506.
(Continued)

*Primary Examiner* — Harry Behm
(74) *Attorney, Agent, or Firm* — Muncy, Geissler, Olds & Lowe, P.C.

(57) ABSTRACT

A DC-to-AC power conversion method is provided, including: generating an AC reference signal and an AC zero crossing detection signal; generating an error signal based on the AC reference signal and an output current or an output voltage at an AC output terminal; generating a turn-off signal based on the error signal and an input current at a DC input terminal; detecting or predicting a valley voltage of a resonance voltage to generate a turn-on signal; generating first, second, third and fourth switching signals based on the AC zero crossing detection signal, the turn-off signal and the turn-on signal; and controlling first, second, third and fourth switching elements of power conversion modules with the first, second, third and fourth switching signals, to enable the first and second power conversion modules to convert the input current of the DC input terminal to the output current of the AC output terminal.

16 Claims, 9 Drawing Sheets

(51) Int. Cl.
*H02M 1/00* (2007.01)
*H02M 3/335* (2006.01)

(56) References Cited

U.S. PATENT DOCUMENTS

| | | |
|---|---|---|
| 7,072,194 B2 | 7/2006 | Nayar et al. |
| 7,796,412 B2 | 9/2010 | Fornage |
| 2004/0027842 A1 | 2/2004 | Tanabe et al. |
| 2008/0089103 A1 | 4/2008 | Hsu et al. |
| 2009/0086514 A1 | 4/2009 | Fornage et al. |
| 2009/0086520 A1 | 4/2009 | Nishimura |
| 2009/0225574 A1 | 9/2009 | Fornage |
| 2011/0234000 A1* | 9/2011 | Yan et al. .................. 307/31 |
| 2012/0008346 A1* | 1/2012 | Kawamura ............. 363/21.15 |
| 2012/0039099 A1 | 2/2012 | Rodriguez |
| 2012/0087157 A1 | 4/2012 | Huang et al. |

FOREIGN PATENT DOCUMENTS

| | | |
|---|---|---|
| CN | 201430532 A | 9/2011 |
| TW | 201101691 A | 1/2011 |
| TW | 201113531 A | 4/2011 |
| WO | WO-2011/102910 A1 | 8/2011 |

OTHER PUBLICATIONS

Gao, Mingzhi et al., Research on Output Current of Interleaved-flyback in Boundary Conduction Mode for Photovoltaic AC Module Application, Energy Conversion Congress and Exposition (ECCE), 2011, pp. 770-775.

Chiang, S.J. et al., Design and Implementation of Boost-type Flyback PV Inverter, Power Electronics and Drive Systems, 2009, pp. 1493-1497.

Terai, H. et al., Utility-Interactive Solar Power Conditioner Using High-Frequency Sinewave Modulated Inverter for Distributed Small-Scale Power Supply, Industrial Electronics, 2002, pp. 942-947.

Joshi, Madhuwanti et al., A High-Efficiency Resonant Solar Micro-Inverter, J. Power Electronics and Applications, 2011, pp. 1-10.

* cited by examiner

DC TO AC POWER CONVERSION WITH RESONANCE VALLEY DETECTION

CROSS-REFERENCE TO RELATED APPLICATIONS

This application claims priority to Taiwanese Application Serial No. 101150917, filed on Dec. 28, 2012. The entirety of the above-mentioned patent application is hereby incorporated by reference herein and made a part of this specification.

TECHNICAL FIELD

This disclosure relates to power conversion apparatuses, and, more particularly, to a DC to AC power conversion apparatus and a method thereof.

BACKGROUND

A traditional DC to AC power conversion apparatus first converts and conditions the DC source through a set of DC/DC converter, then uses a set of DC/AC inverter formed by bridge switches to generate the AC source alternating with positive and negative, and finally outputs the power after filtering out the high frequency signal of the AC source by LC filter.

In other words, the traditional DC to AC power converter needs a set of DC/AC inverter formed by bridge switches, through which to generate the AC source alternating with positive and negative before outputting the filtered AC source. The bridge switches generally include a plurality of switching elements, which is undoubtedly a huge load for the cost of the DC to AC power converter. Moreover, the bridge switches cause energy losses during switching and ON states which influence the conversion efficiency of the DC to AC power converter. Meanwhile, in order to keep the bridge switches in normal operation, additional controller and drive circuit are required, which makes the complexity of the control circuit considerably increase so that the difficulty of circuit design becomes higher.

Therefore, how to overcome drawbacks in the prior art mentioned above to promote the conversion efficiency of the DC to AC power converter and decrease the complexity of circuit design is thus becoming important issues for people skilled in the art.

SUMMARY OF THE DISCLOSURE

This disclosure provides a DC to AC power conversion apparatus, comprising: a first power conversion module having a first transformer, a first switching element and a second switching element, wherein the first transformer includes a primary-side coil having two ends electrically connected to the first switching element and a DC input terminal, respectively, and a secondary-side coil having two ends electrically connects to an AC output terminal and the second switching element, respectively; a second power conversion module having a second transformer, a third switching element and a fourth switching element, wherein the second transformer includes a primary-side coil having two ends electrically connected the third switching element and the DC input terminal, respectively, and a secondary-side coil having two ends electrically connected to the fourth switching element and the AC output terminal, respectively; and a control module having a valley voltage detector that detects or predicts a valley voltage of a resonance voltage to generate a turn-on signal, generating a first switching signal, a second switching signal, a third switching signal, and a fourth switching signal based on the turn-on signal, and controlling the first switching element, the second switching element, the third switching element and the fourth switching element with the first switching signal, the second switching signal, the third switching signal and the fourth switching signal, respectively, such that the first power conversion module and the second power conversion module convert an input current at the DC terminal to an output current at the AC terminal.

This disclosure further provides a DC to AC power conversion method, comprising: generating an AC reference signal and an AC zero crossing detection signal; generating an error signal based on the AC reference signal and an output current or an output voltage at an AC output terminal; generating a turn-off signal based on the error signal and an input current at a DC input terminal; detecting or predicting a valley voltage of a resonance voltage to generate a turn-on signal; generating a first switching signal, a second switching signal, a third switching signal and a fourth switching signal based on the AC zero crossing detection signal, the turn-off signal and the turn-on signal; and controlling a first switching element, a second switching element, a third switching element and a fourth switching element of a first power conversion module and a second power conversion module with the first switching signal, the second switching signal, the third switching signal and the fourth switching signal, so as to enable the first power conversion module and the second power conversion module to convert the input current at the DC input terminal to the output current at the AC output terminal.

BRIEF DESCRIPTION OF DRAWINGS

The disclosure can be more fully understood by reading the following detailed description of the preferred embodiments, with reference made to the accompanying drawings, wherein.

DETAILED DESCRIPTION OF THE DISCLOSURE

In the following detailed description, for purposes of explanation, numerous specific details are set forth in order to provide a through understanding of the disclosed embodiments. It will be apparent, however, that one or more embodiments may be practiced without these specific details. In other instances, well-known structures and devices are schematically shown in order to simplify the drawing.

Figure 1A:
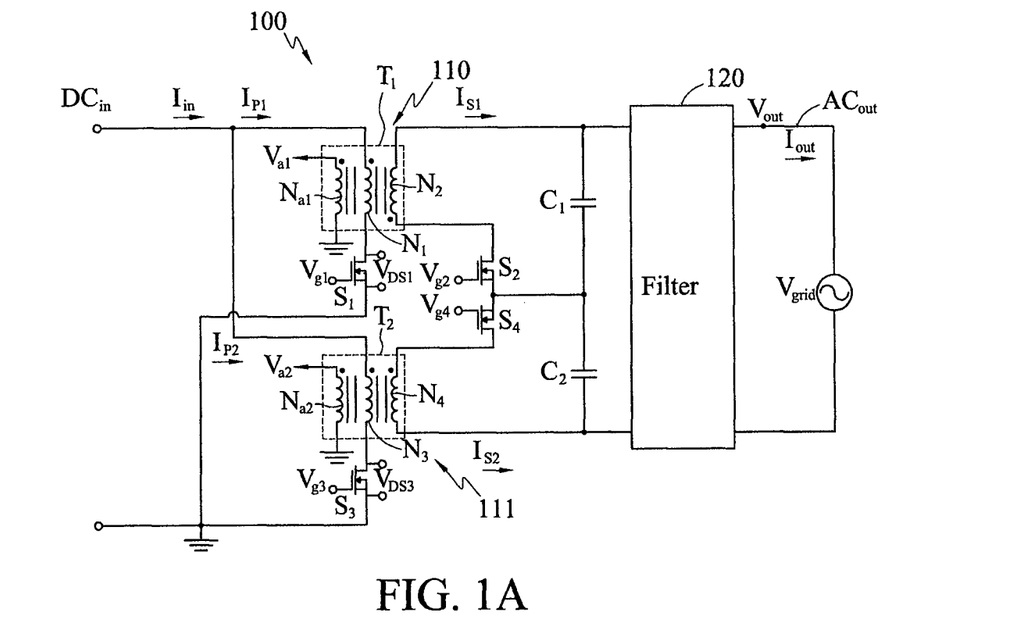
FIG. 1A illustrates a circuit diagram of a first example of power conversion in a DC to AC power conversion apparatus according to this disclosure.
Figure 1B:
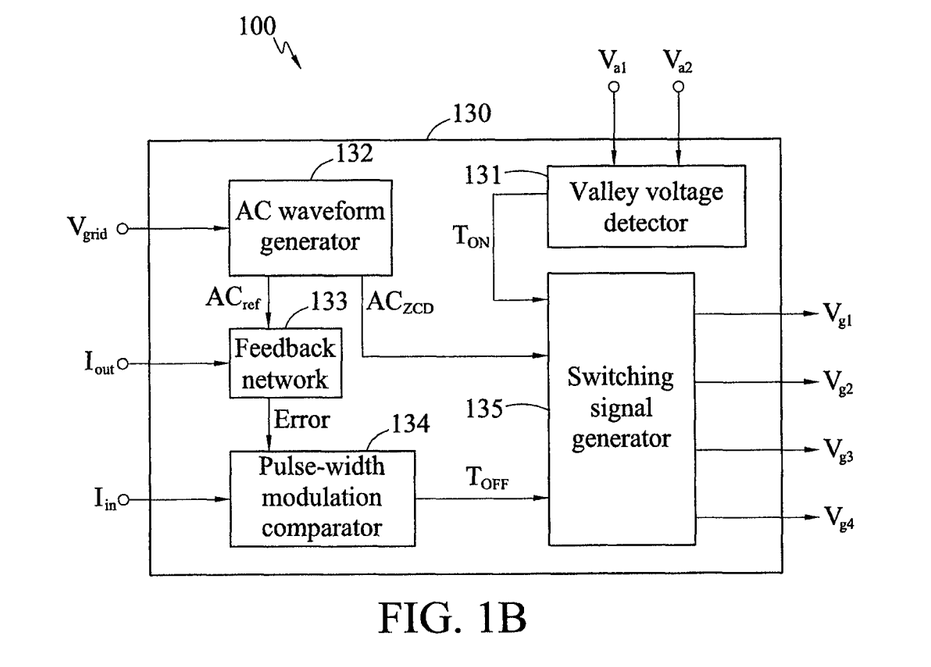
FIG. 1B illustrates a circuit diagram of a first control module in a DC to AC power conversion apparatus according to this disclosure.

FIGS. 1A and 1B illustrate a circuit diagram of a first example of power conversion module in a DC to AC power conversion apparatus 100 according to this disclosure. The DC to AC power conversion apparatus 100 operates in a grid connected mode, and includes the first power conversion module 110, a second power conversion module 111, and a control module 130.

The first power conversion module 110 has a first transformer $T_1$, a first switching element $S_1$, a second switching element $S_2$, and a first capacitor $C_1$. In an embodiment, the first transformer $T_1$ is an isolation transformer, and the first switching element $S_1$ or the second switching element $S_2$ is a metal-oxide-semiconductor field-effect transistor (MOSFET) or an insulated-gate bipolar transistor (IGBT).

Two ends of a primary-side coil $N_1$ of the first transformer $T_1$ are electrically connected to a DC input terminal $DC_{in}$ and the first switching element $S_1$, respectively. Two ends of a secondary-side coil $N_2$ of the first transformer $T_1$ are electrically connected to the second switching element $S_2$ and the AC output terminal $AC_{out}$, respectively. The first capacitor $C_1$ is in parallel with the secondary-side coil $N_2$ and the second switching element $S_2$.

The second power conversion module 111 has a second transformer $T_2$, a third switching element $S_3$, a fourth switching element $S_4$, and a second capacitor $C_2$. In an embodiment, the second transformer $T_2$ is an isolation transformer, and the third switching element $S_3$ or the fourth switching element $S_4$ is a metal-oxide-semiconductor field-effect transistor (MOSFET) or an insulated-gate bipolar transistor (IGBT).

Two ends of the primary-side coil $N_3$ of the second transformer $T_2$ are electrically connected to the DC input terminal $DC_{in}$ and the third switching element $S_3$, respectively. Two ends of the secondary-side coil $N_4$ of the second transformer $T_2$ are electrically connected to the fourth switching element $S_4$ and the AC output terminal $AC_{out}$, respectively. The second capacitor $C_2$ is in parallel with the secondary-side coil $N_4$ and the fourth switching element $S_4$.

The first power conversion module 110 generates the positive half-cycle of an output current $I_{out}$ or an output voltage $V_{out}$. During the positive half-cycle, the first switching signal $V_{g1}$ is a high frequency switching (switching between ON and OFF rapidly), the second switching signal $V_{g2}$ is turn-off (OFF), the third switching signal $V_{g3}$ is OFF, and the fourth switching signal $V_{g4}$ is turn-on (ON).

When the first switching signal $V_{g1}$ is ON, the input current $I_{in}$ (primary-side current $I_{P1}$) of the DC input terminal $DC_{in}$ will pass through the first switching element $S_1$, and the energy of the input current $T_{in}$ is stored by the magnetizing inductance of the primary-side coil $N_1$ in the first transformer $T_1$. When the first switching $V_{g1}$ is OFF, the energy will be output to the AC output terminal $AC_{out}$ through the secondary-side coil $N_2$ of the first transformer $T_1$ and the body diode inside the second switching element $S_2$.

Similarly, the second power conversion module 111 generates the negative half-cycle of output current $I_{out}$ or an output voltage $V_{out}$. During the negative half-cycle, the first switching signal $V_{g1}$ is OFF, the second switching signal $V_{g2}$ is ON, the third switching signal $V_{g3}$ is high frequency switching (switching between ON and OFF rapidly), and the fourth switching signal $V_{g4}$ is OFF.

When the third switching signal $V_{g3}$ is ON, the input current $I_{in}$ (primary-side current $I_{P2}$) of the DC input terminal $DC_{in}$ will pass through the third switching element $S_3$, and the energy of the input current $I_{in}$ is stored by the magnetizing inductance of the primary-side coil $N_3$ in the second transformer $T_2$. When the third switching $V_{g3}$ is OFF, the energy will be output to the AC output terminal $AC_{out}$ through the secondary-side coil $N_4$ of the second transformer $T_2$ and the body diode inside the second switching element $S_4$.

The control module 130 has a valley voltage detector 131, an AC waveform generator 132, a feedback network 133, a pulse-width modulation (PWM) comparator 134, and a switching signal generator 135.

The valley voltage detector 131 detects or predicts a valley voltage of a resonance voltage to generate a turn-on ($T_{ON}$) signal, and is electrically connected to the first auxiliary coil $N_{a1}$ of the first transformer $T_1$ and the second auxiliary coil $N_{a2}$ of the second transformer $I_2$. Moreover, the first auxiliary coil $N_{a1}$ and the second auxiliary coil $N_{a2}$ are arranged on the primary-sides of the first transformer $T_1$ and the second transformer $T_2$, respectively.

When the secondary-side current $I_{s1}$ of the first transformer $T_1$ or the secondary-side current $I_{s2}$ of the second transformer $T_2$ is output to the AC output terminal $AC_{out}$ and decreases to a zero current, the first voltage signal $V_{a1}$ of the first auxiliary coil $N_{a1}$ or the second voltage signal $V_{a2}$ of the second auxiliary coil $N_{a2}$ will generate the resonance voltage, and the valley voltage of the resonance voltage is less than the zero voltage.

Furthermore, when the first voltage signal $V_{a1}$ or the second voltage signal $V_{a2}$ decreases to the zero voltage, the valley voltage detector 131 will detect the zero voltage to generate $T_{ON}$ signal while below (included) the zero voltage, and turn on the first switching signal $V_{g1}$, the second switching signal $V_{g2}$, the third switching signal $V_{g3}$ or the fourth switching signal $V_{g4}$ based on the falling edge of $T_{ON}$ signal.

The AC waveform generator 132 operates in a grid connected mode for generating an AC reference signal $AC_{ref}$ and an AC zero crossing detection signal $AC_{ZCD}$ based on the grid voltage $V_{grid}$.

The feedback network 133 is electrically connected to the waveform generator 132 and the AC output terminal $AC_{out}$, and generate the error signal (Error) based on the AC reference signal $AC_{ref}$ and the output current $I_{out}$ at an AC output terminal $AC_{out}$.

The pulse-width modulation comparator 134 is electrically connected to the feedback network 133 and the DC input terminal $DC_{in}$ to generate a $T_{OFF}$ signal based on the error signal and the input current $I_{in}$, and turn off the first switching signal $V_{g1}$, the second switching signal $V_{g2}$, the third switching signal $V_{g3}$, and the fourth switching signal $V_{g4}$ based on the rising edge of the $T_{OFF}$ signal.

The switching signal generator 135 is electrically connected to the AC waveform generator 132, the pulse-width modulation comparator 134, and the valley voltage detector 131, and generates the first switching signal $V_{g1}$, the second switching signal $V_{g2}$, the third switching signal $V_{g3}$, and the fourth switching signal $V_{g4}$ based on the AC zero crossing detection signal $AC_{ZCD}$, the $T_{OFF}$ signal and the $T_{ON}$ signal to separately control the first switching element $S_1$, the second switching element $S_2$, the third switching element $S_3$ and the fourth switching element $S_4$ such that the first power conversion module 110 and the second power conversion module 111 convert the input current $T_{in}$ at the DC input terminal $DC_{in}$ to the output current $I_{out}$ at the AC output terminal $AC_{out}$.

Additionally, the DC to AC power conversion apparatus 100 includes a filter 120. The filter 120 has one end electrically connected to the first power conversion module 110 and the second power conversion module 111, and the other end electrically connected to the AC output terminal $AC_{out}$, for filtering out the high frequency signal of the secondary-side current $I_{s1}$ or the secondary-side current $I_{s2}$.

Figure 2A:
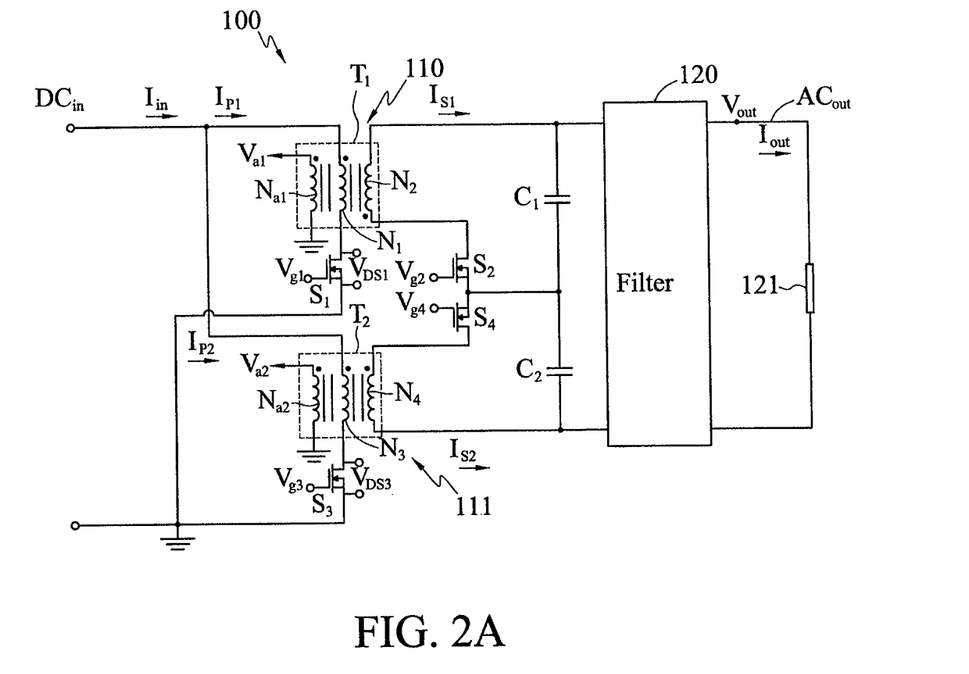
FIG. 2A illustrates a circuit diagram of a second example of power conversion in a DC to AC power conversion apparatus according to this disclosure.
Figure 2B:
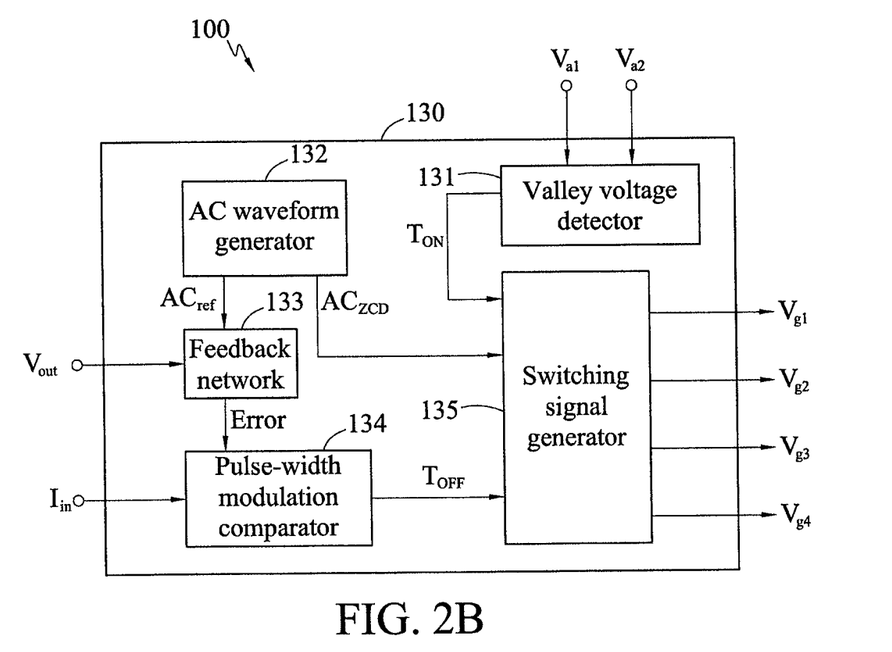
FIG. 2B illustrates a circuit diagram of a second control module in a DC to AC power conversion apparatus according to this disclosure.

FIGS. 2A and 2B illustrate circuit diagrams of the second example of power conversion module and the control module in a DC to AC power conversion apparatus according to this disclosure, respectively. The second example of power conversion module is almost identical with the first example of power conversion module and the control module in FIGS. 1A and 1B, and thus the identical part thereof is omitted. The major difference therebetween is described as follows.

In FIGS. 2A and 2B, the DC to AC power conversion apparatus 100 operates in a stand-alone mode, a grid voltage $V_{grid}$ in FIG. 1 as a load 121. An AC waveform generator 132 also operates in the stand-alone mode, and independently generates an AC reference signal $AC_{ref}$ and an AC zero crossing detection signal $AC_{ZCD}$. A feedback network 123 generates the error signal based on the AC reference signal $AC_{ref}$ and the output voltage $V_{out}$ at the AC output terminal $AC_{out}$.

Figure 3:
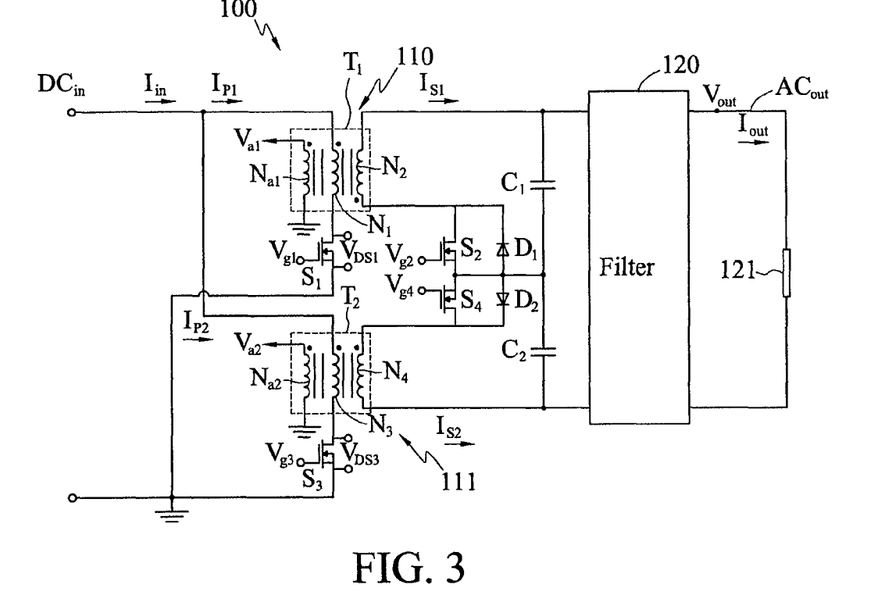
FIG. 3 illustrates a circuit diagram of a third example of power conversion in a DC to AC power conversion apparatus according to this disclosure.

FIG. 3 illustrates the circuit diagram for the third example of power conversion module in the DC to AC power conversion apparatus according to this disclosure. The third example of power conversion module is almost identical with the second example of power conversion module in FIG. 2A, and the identical part thereof is thus omitted. The major difference therebetween is as follows.

In FIG. 3, the first power conversion module 110 has the first diode $D_1$ in parallel with the second switching element $S_2$ so as to improve the function of body diode inside the second switching element $S_2$, so the secondary-side current $I_{s1}$ is easy to flow through the body diode of the second switching element $S_2$ and the first diode $D_1$ to output to the AC output terminal $AC_{out}$.

Likewise, the second power conversion module 111 also has the second diode $D_2$ in parallel with the fourth switching element $S_4$ so as to improve the function of body diode inside the fourth switching element $S_4$, so the secondary-side current $I_{s2}$ is easy to flow through the body diode of the fourth switching element $S_4$ and the second diode $D_2$ to output to the AC output terminal $AC_{out}$.

Figure 4:
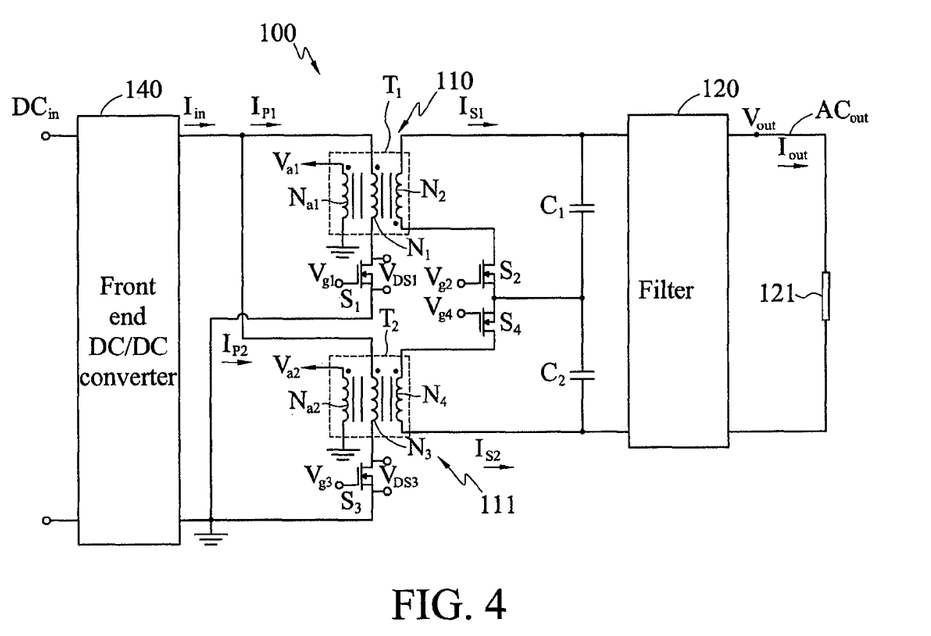
FIG. 4 illustrates a circuit diagram of fourth example of power conversion in a DC to AC power conversion apparatus according to this disclosure.

FIG. 4 illustrates the circuit diagram for the fourth example of power conversion module in the DC to AC power conversion apparatus according to this disclosure. The fourth example of power conversion module is almost identical with the second example of power conversion module in FIG. 2A, and thus the identical part is omitted. The major difference therebetween is as follows.

In FIG. 4, the DC to AC power conversion apparatus 100 comprises a front end DC/DC converter 140. In an embodiment, the front end DC/DC converter 140 is a step-up, step-down or any type of a converter, and has one end electrically connected to the DC input terminal $DC_{in}$, and the other end electrically connected to the first power conversion module 110 and the second power conversion module 111.

The input current $I_{in}$ of the DC input terminal $DC_{in}$ first regulates the voltage through the front end DC/DC converter 140, and input to the first power conversion module 110 and the second power conversion module 111, further converts to the output current $I_{out}$ of the AC output terminal $AC_{out}$. Thus, the range of the input current $I_{in}$ may be more wide and increase the generation efficiency of the first power conversion module 110 and the second power conversion module 111. Moreover, the front end DC/DC converter 140 also has the effect of eliminating current ripples of the input current $I_{in}$ to reduce the capacitance of the input filter capacitor.

Figure 5:
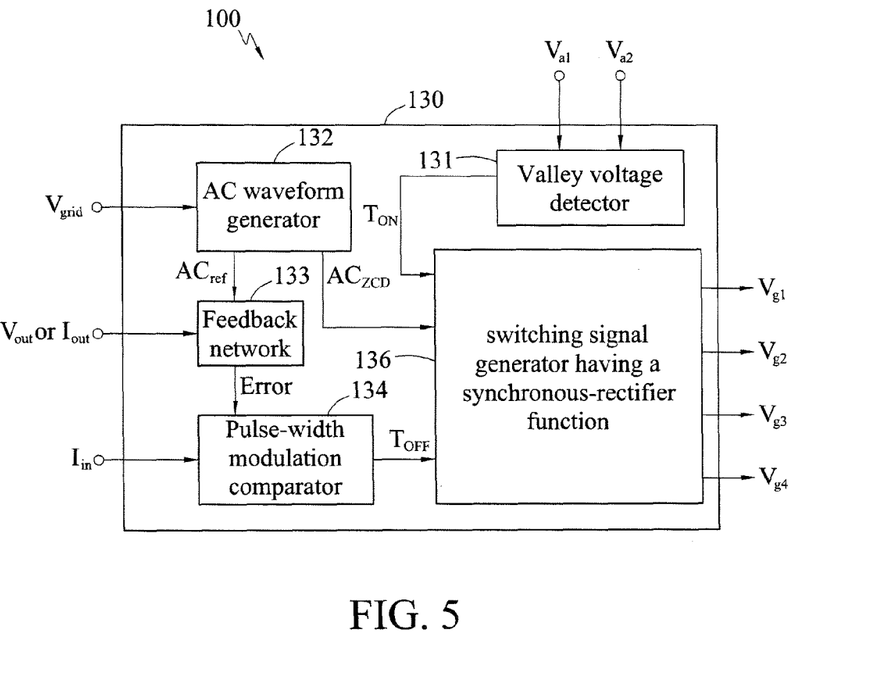
FIG. 5 illustrates a circuit diagram of a third control module in a DC to AC power conversion apparatus according to this disclosure.

FIG. 5 illustrates the circuit diagram for the third control module in the DC to AC power conversion apparatus according to this disclosure. The third control module is almost identical with the first control module in FIG. 1B, and thus the identical part thereof is omitted. The major difference therebetween is as follows.

In FIG. 5, a switching signal generator 136 having a synchronous-rectifier function enables the first switching signal $V_{g1}$ and the second switching signal $V_{g2}$ to generate corresponding high frequency switching. When the first switching element $S_1$ shown in FIG. 1A is turn-off (OFF), and the stored energy of the first transformer $T_1$ is output to the AC output terminal $AC_{out}$ through the secondary-side coil $N_2$ of the first transformer $T_1$, the body diode inside the second switching element $S_2$ or the first diode $D_1$ (shown in FIG. 3) in parallel, the second switching signal $V_{g2}$ may synchronously turn on the second switching element $S_2$ to achieve the synchronous-rectifier function and achieve the effect of increasing the efficiency.

Similarly, a switching signal generator 136 having a synchronous-rectifier function also enables the third switching signal $V_{g3}$ and the fourth switching signal $V_{g4}$ to generate corresponding high frequency switching. When the third switching element $S_3$ shown in FIG. 1A is OFF, and the stored energy of the second transformer $T_2$ is output to the AC output terminal $AC_{out}$ through the secondary-side coil $N_4$ of the second transformer $T_2$, the body diode inside the fourth switching element $S_4$ or the second diode $D_2$ (as shown in FIG. 3) in parallel, the fourth switching signal $V_{g4}$ may synchronously turn on the fourth switching element $S_4$ to achieve the synchronous-rectifier function and achieve the effect of increasing the efficiency.

Figure 6:
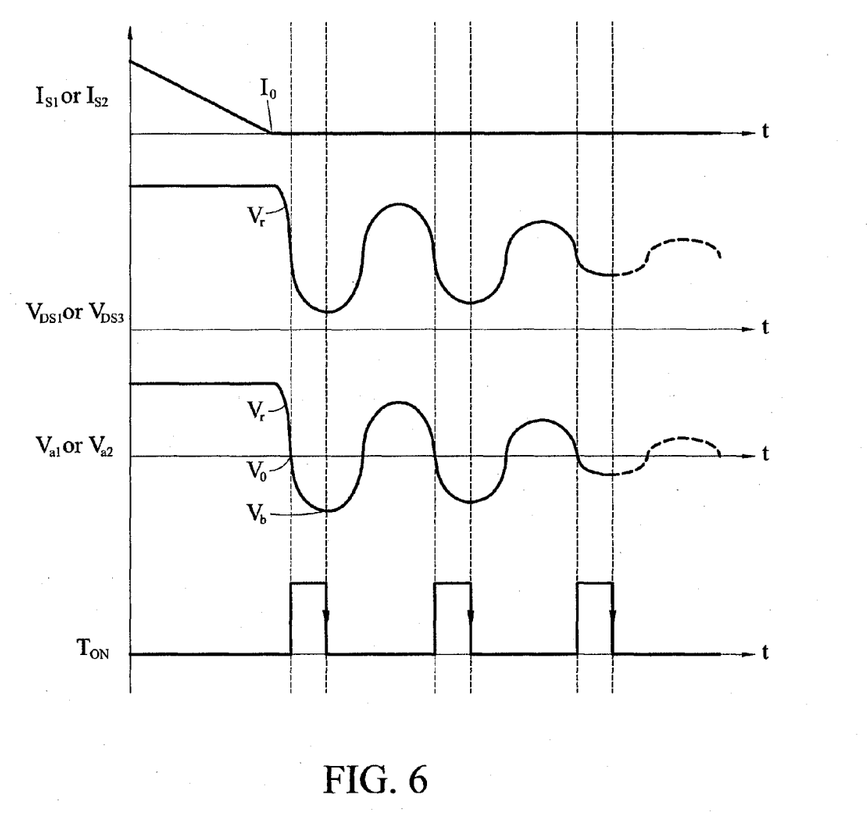
FIG. 6 illustrates a waveform diagram of a voltage signal and a turn-on ($T_{ON}$) signal relating a secondary-side current and an auxiliary coil in the operation principle for a valley voltage detection function according to this disclosure.

FIG. 6 illustrates the waveform diagram of voltage signal and $T_{ON}$ signal relating to the secondary-side current and auxiliary coil in the operation principle for the valley voltage detection function according to this disclosure.

As shown in FIGS. 6 and 1A-1B, when the first switching element $S_1$ or the third switching element $S_3$ is OFF, the stored energy of the first transformer $T_1$ or the second transformer $T_2$ is output to the AC output terminal $AC_{out}$ through the secondary-side coil $N_2$ or the secondary-side coil $N_4$ such that the secondary-side current $L_1$ of the first transformer $T_1$ or the secondary-side current $I_{s2}$ of the second transformer $T_2$ decreases with the output of the energy.

When the secondary-side current $I_{s1}$ or the secondary-side current $I_{s2}$ is output to the AC output terminal $AC_{out}$ and decreases to a zero current $I_0$, the total capacitance (including the stray capacitance of first transformer $T_1$ and the output capacitance of first switching element $S_1$) and the magnetizing inductance in the circuit of the first transformer $T_1$ may occur resonance such that the drain-to-source voltage $V_{DS1}$ of the first switching element $S_1$ and the first voltage signal $V_{a1}$ of the first auxiliary coil $N_{a1}$ generate a resonance voltage $V_r$; or, the total capacitance (including the stray capacitance of second transformer $T_2$ and the output capacitance of third switching element $S_3$) and the magnetizing inductance in circuit of the second transformer $T_2$ may occur resonance such that the drain-to-source voltage $V_{DS3}$ of the third switching element $S_3$ and the second voltage signal $V_{a2}$ of the second auxiliary coil $N_{a2}$ generate a resonance voltage $V_r$.

When the first voltage signal $V_{a1}$ or the second voltage signal $V_{a2}$ passes through the zero voltage $V_0$, the generation of resonance voltage $V_r$ is detected. With the appropriate delay, the valley voltage $V_b$ of every resonance voltage $V_r$ can be predicted. Moreover, when the first voltage signal $V_{a1}$ or the second voltage signal $V_{a2}$ decreases to the zero voltage, the valley voltage detector 131 will detect the zero voltage $V_0$ to generate a turn-on ($T_{ON}$) signal while below (included) the zero voltage, and turn on the first switching signal $V_{g1}$, the second switching signal $V_{g2}$, the third switching signal $V_{g3}$ or the fourth switching signal $V_{g4}$ based on the falling edge of $T_{ON}$ signal.

By this, with an appropriate design, valley voltage $V_b$ of the resonance voltage $V_r$ of the drain-to-source voltage $V_{DS1}$ or $V_{DS3}$ may be lower or equal to the zero voltage $V_0$. The switching operation of zero voltage can be achieved if the first switching element $S_1$ or the third switching element $S_3$ is turned on now.

Therefore, because of the primary-side of the first power conversion module 110 and the second power conversion module 111 perform the switching operation of the zero voltage, the secondary-side performs the switching operation of the zero current. Thus, the switching lossed of the first switching element $S_1$, the second switching element $S_2$, the third switching element $S_3$ and the fourth switching element $S_4$ may be reduced, and decrease the electromagnetic interference caused by switching operation, and further promote the conversion efficiency and the efficacy of the first power conversion module 110 and the second power conversion module 111.

The valley voltage detection function mentioned above is merely an exemplary embodiment method, but not for limiting this disclosure. Other embodiments may also be possible to achieve the mentioned function.

Figure 7:
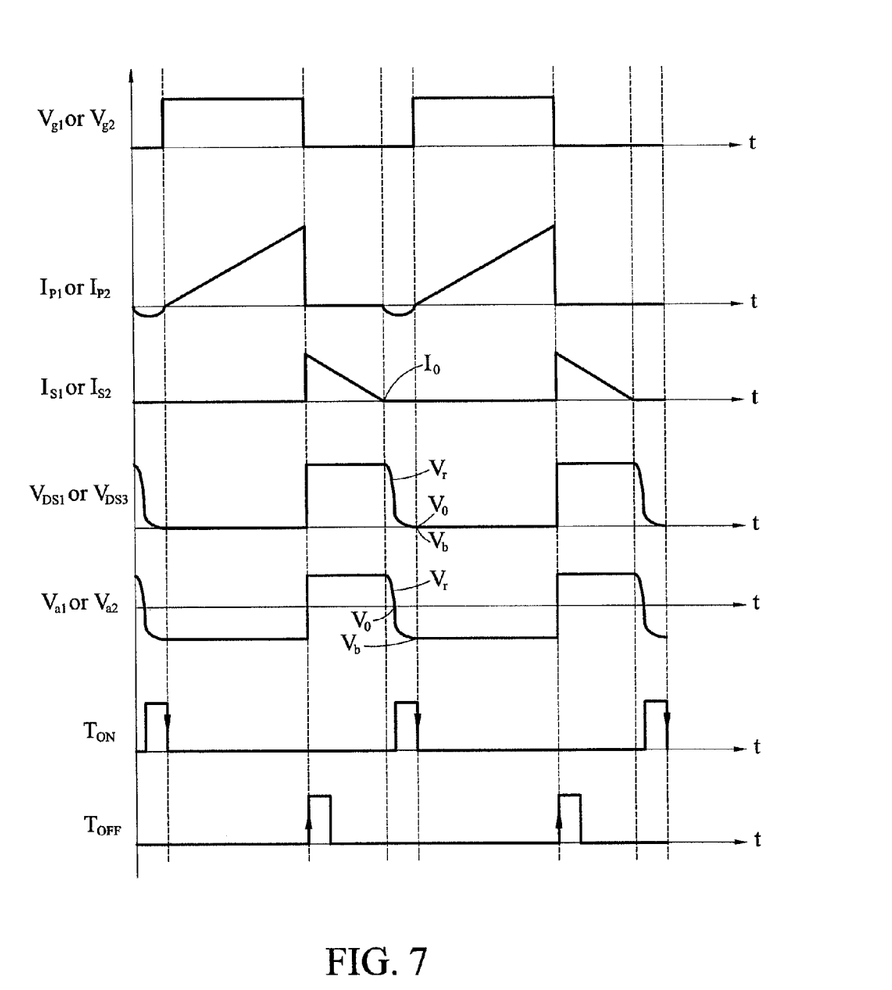
FIG. 7 illustrates a waveform diagram for using a valley voltage detection function and turn-off ($T_{OFF}$) signal to generate a switching signal in a control module according to this disclosure.

FIG. 7 illustrates the waveform diagram for using valley voltage detection function and a turn-off ($T_{OFF}$) signal to generate the switching signal in the control module according to this disclosure.

In FIG. 6 and the description thereof, the operation principle of valley voltage detection has been specified, and thus the descriptions regarding to secondary-side current $I_{S1}$ or secondary-side current $I_{S2}$, first voltage signal $V_{a1}$ or second voltage signal $V_{a2}$, drain-to-source voltage $V_{DS1}$ or drain-to-source voltage $V_{DS3}$, $T_{ON}$ signal, etc, is omitted.

As shown in FIGS. 7 and 1A-1B, when the secondary-side current $I_{S1}$ or the secondary-side current $I_{S2}$ is output to the AC output terminal $AC_{out}$ and decreases to zero current $I_0$, the drain-to-source voltage $V_{DS1}$ and the first voltage signal $V_{a1}$ generate a resonance voltage $V_r$, or the drain-to-source voltage $V_{DS2}$ and the second voltage signal $V_{a2}$ generate a resonance voltage $V_r$.

When the first voltage signal $V_{a1}$ or the second voltage signal $V_{a2}$ passes through the zero voltage $V_0$, the generation of resonance voltage $V_r$ is detected. With the appropriate delay, the valley voltage $V_b$ of every resonance voltage $V_r$ can be predicted. Moreover, when the first voltage signal $V_{a1}$ or the second voltage signal $V_{a2}$ decreases to the zero voltage, the valley voltage detector 131 will detect the zero voltage $V_0$ to generate $T_{ON}$ signal while below (included) the zero voltage, and turn on the first switching signal $V_{g1}$, the second switching signal $V_{g2}$, the third switching signal $V_{g3}$ or the fourth switching signal $V_{g4}$ based on the falling edge of $T_{ON}$ signal such that the primary-side current $I_{P1}$ stores energy through the first transformer $T_1$ or such that the primary current $I_1)_2$ stores energy through the second transformer $T_2$.

Subsequently, a pulse-width modulation comparator 134 would generate $T_{OFF}$ signal, and turn off the first switching signal $V_{g1}$, the second switching signal $V_{g2}$, the third switching signal $V_{g3}$ or the fourth switching signal $V_{g4}$ based on the rising edge of $T_{OFF}$ signal such that the secondary-side current $I_{s1}$ or the secondary-side current $I_{s2}$ outputs again to the AC output terminal $AC_{out}$ and decrease to the zero current $I_0$.

Figure 8:
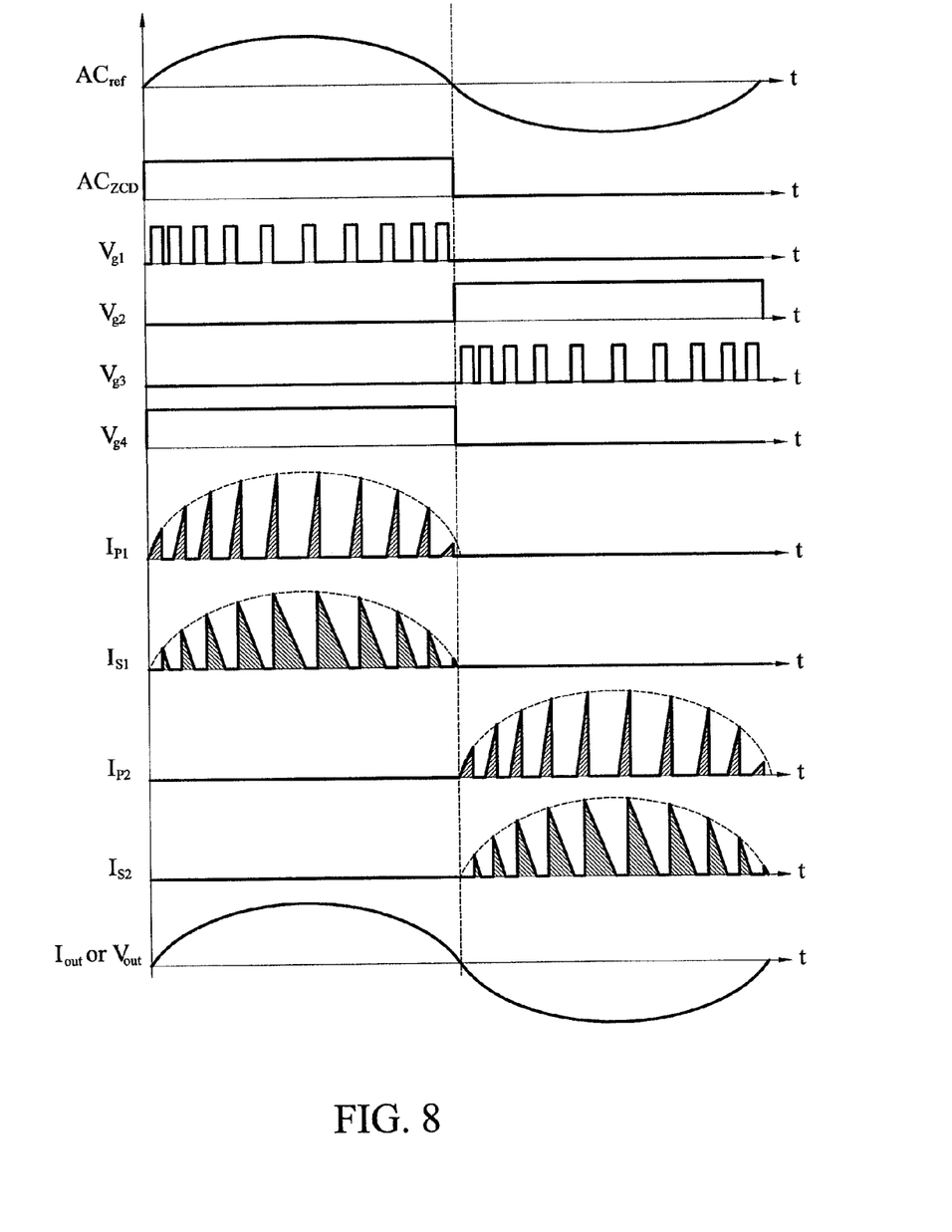
FIG. 8 illustrates a waveform diagram of a first switching control strategy applied by a DC to AC power conversion apparatus according to this disclosure to generate an output current at the AC output terminal.

FIG. 8 illustrates the waveform diagram for the first switching control strategy applied by the DC to AC power conversion apparatus according to this disclosure to generate output current of the AC output terminal.

As shown in FIGS. 8 and 1A-1B, an AC waveform generator 132 generates an AC reference signal $AC_{ref}$ and an AC zero crossing detection signal $AC_{ZCD}$.

When the AC reference signal $AC_{ref}$ is positive half-cycle, the AC crossing zero detection signal $AC_{ZCD}$ is high. Switch control strategy comprises: first switching signal $V_{g1}$ is high frequency switching, second switching signal $V_{g2}$ is OFF, third switching signal $V_{g3}$ is OFF and fourth switching signal $V_{g4}$ is ON. By this, primary-side current $I_{P1}$ and secondary-side current $I_{S1}$ form a plurality of triangle waves with different magnitudes based on the AC reference signal $AC_{ref}$ and the first switching signal $V_{g1}$, and the profile formed by ends of those triangle waves is similar to a sine wave. Thus the first power conversion module 110 generates the positive half-cycle of output current $I_{out}$ or output voltage $V_{out}$.

Similarly, when the AC reference signal $AC_{ref}$ is negative half-cycle, the AC crossing zero detection signal $AC_{ZCD}$ is low or zero. The switch control strategy comprises: first switching signal $V_{g1}$ is OFF, second switching signal $V_{g2}$ is ON, third switching signal $V_{g3}$ is high frequency switching and fourth switching signal $V_{g4}$ is OFF. By this, primary-side current $I_{P2}$ and secondary-side current $I_{s2}$ form a plurality of triangle waves with different magnitudes based on the AC reference signal $AC_{ref}$ and the third switching signal $V_{g3}$, and the profile formed by ends of those triangle waves is similar to a sine wave. Thus the second power conversion module 111 generates the negative half-cycle of output current $I_{out}$ or output voltage $V_{out}$.

Figure 9:
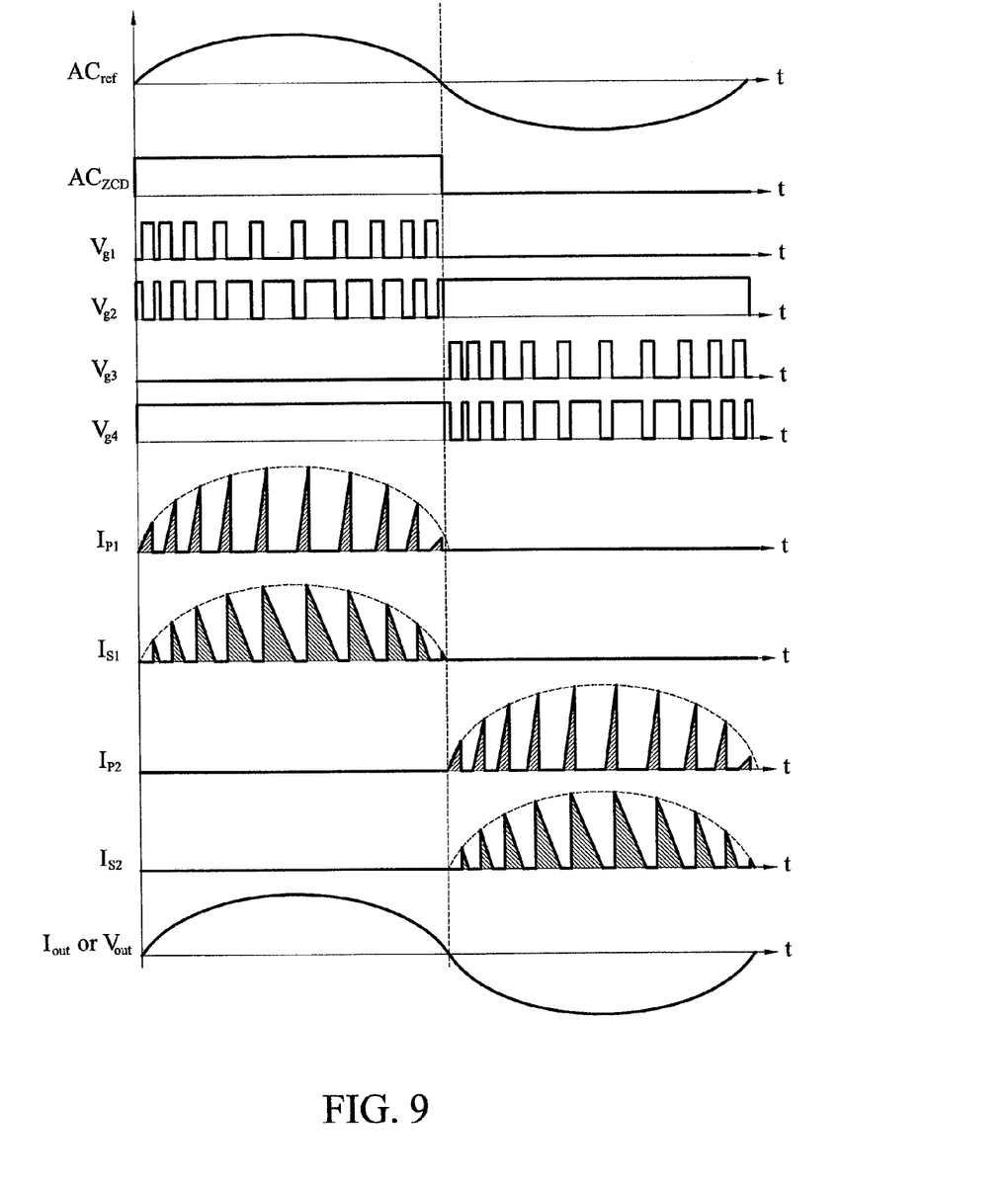
FIG. 9 illustrates a waveform diagram of a second switching control strategy applied by a DC to AC power conversion apparatus according to this disclosure to generate an output current at the AC output terminal.

FIG. 9 illustrates the waveform diagram for the second switching control strategy applied by the DC to AC power conversion apparatus according to this disclosure to generate output current of the AC output terminal.

The second switching control strategy is almost identical with the first switching control strategy and waveform diagram in FIG. 8, and thus the identical part thereof is omitted. The major difference therebetween is as follows.

As shown in FIGS. 9 and 5, a switching signal generator 136 having a synchronous-rectifier function enables the first switching signal $V_{g1}$ and the second switching signal $V_{g2}$ to generate corresponding high frequency switching, or enables the third switching signal $V_{g3}$ and the fourth switching signal $V_{g4}$ to generate corresponding high frequency switching to achieve the effect of synchronous rectifier, and to reduce the turn on loss when a body diode of the second switching element $S_2$, a body diode of the fourth switching element $S_4$, the first diode $D_1$ or the second diode $D_2$ is ON as shown in FIG. 3.

Figure 10:
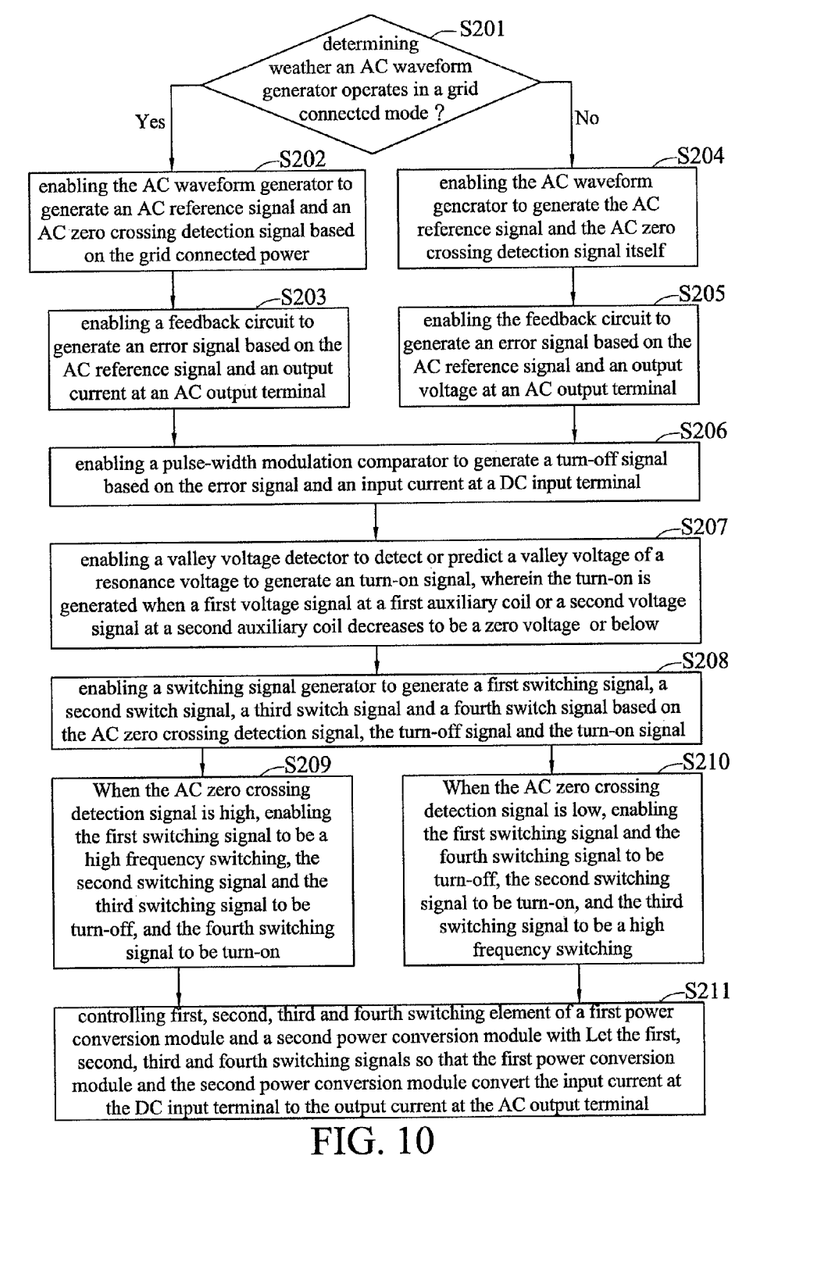
FIG. 10 illustrates a flow chart of a DC to AC power conversion method according to this disclosure.

FIG. 10 illustrates a flow chart of a DC to AC power conversion method according to this disclosure.

AS shown in FIG. 10, the DC to AC power conversion method may comprise following steps.

In step S201, weather the AC waveform generator is in a grid connected mode is determined. If the AC waveform generator is in the grid connected mode, the method proceeds to step S202, otherwise proceeds to step S204, which means that the AC waveform generator is in a stand-alone mode.

In step S202, the AC waveform generator generates an AC reference signal and an AC zero crossing detection signal based on the grid connected power. The method proceeds to step S203.

In step S203, a feedback circuit generates an error signal based on the AC reference signal and output current of AC output terminal. The method proceeds to step S206.

In step S204, the AC waveform generator independently generates the AC reference signal and the AC zero crossing detection signal. The method proceeds to step S205.

In step S205, the feedback circuit generates an error signal based on the AC reference signal and output voltage of AC output terminal. The method proceeds to step S206.

In step S206, a pulse-width modulation comparator generates a $T_{OFF}$ signal based on the error signal and input current of DC input terminal. The method proceeds to step S207.

In step S207, a valley voltage detector detects or predicts a valley voltage of a resonance voltage to generate a $T_{ON}$ signal. The $T_{ON}$ signal is generated when the first voltage signal of the first auxiliary coil or the second voltage signal of the second auxiliary coil decreases to the zero voltage or below. The method proceeds to step S208.

In step S208, a switching signal generator generates a first switching signal, a second switch signal, a third switch signal and a fourth switch signal based on the AC zero crossing detection signal, the $T_{OFF}$ signal and the $T_{ON}$ signal. The method proceeds to step S209 or step S210.

In step S209, when the AC zero crossing detection signal is high, the first switching signal is high frequency switching, the second switching signal is OFF, the third switching signal is OFF, and the fourth switching signal is ON. The method proceeds to step S211.

In step S210, when the AC zero crossing detection signal is low, the first switching signal is OFF, the second switching signal is ON, the third switching signal is high frequency switching, and the fourth switching signal is OFF. The method proceeds to step S211.

In step S211, the first, second, third and fourth switching signals control the first, second, third and fourth switching elements of the first power conversion module and the second power conversion module, respectively, such that the first power conversion module and the second power conversion module convert the input current at the DC input terminal to the output current at the AC output terminal.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A DC to AC power conversion apparatus, comprising:
a first power conversion module having a first transformer, a first switching element and a second switching element, wherein the first transformer includes a primary-side coil having two ends electrically connected to the first switching element and a DC input terminal, respectively, and a secondary-side coil electrically connected to the second switching element;
a second power conversion module having a second transformer, a third switching element and a fourth switching element, wherein the second transformer includes a primary-side coil having two ends electrically connected the third switching element and the DC input terminal, respectively, and a secondary-side coil electrically connected to the fourth switching element; and
a control module having a valley voltage detector that detects or predicts a valley voltage of a resonance voltage to generate a turn-on signal, generating a first switching signal, a second switching signal, a third switching signal, and a fourth switching signal based on the turn-on signal, and controlling the first switching element, the second switching element, the third switching element and the fourth switching element with the first switching signal, the second switching signal, the third switching signal and the fourth switching signal, respectively, such that the first power conversion module and the second power conversion module convert an input current at the DC input terminal to an output current at an AC output terminal,
wherein the control module further has an AC waveform generator that operates in a grid connected mode or a standalone mode to generate an AC reference signal and an AC zero crossing detection signal itself or based on grid connected power.

2. The DC to AC power conversion apparatus of claim 1, wherein the first power conversion module generates a positive half-cycle of the output current, during which the first switching signal is a high frequency switching, the second switching signal and the third switching signal are turn-off, and the fourth switching signal is turn-on.

3. The DC to AC power conversion apparatus of claim 1, wherein the second power conversion module generates a negative half-cycle of the output current during which the first switching signal and the fourth switching signal are turn-off, the second switching signal is turn-on, and the third switching signal is high frequency switching.

4. The DC to AC power conversion apparatus of claim 1, wherein the first switching element, the second switching element, the third switching element and the fourth switching element are metal-oxide-semiconductor field-effect transistors or insulated-gate bipolar transistors.

5. The DC to AC power conversion apparatus of claim 1, wherein the control module further has a feedback network that is electrically connected to the AC waveform generator and the AC output terminal and generates an error signal based on the AC reference signal and the output current or an output voltage at the AC output terminal.

6. The DC to AC power conversion apparatus of claim 5, wherein the control module further has a pulse-width modulation comparator that is electrically connected to the feedback network and the DC input terminal and generates a turn-off signal based on the error signal and the input current to turn-off the first switching signal, the second switching signal, the third switching signal or the fourth switching signal.

7. The DC to AC power conversion apparatus of claim 6, wherein the first transformer further has a first auxiliary coil arranged at a primary side thereof, the second transformer further has a second auxiliary coil arranged at a primary side thereof, and the first auxiliary coil and the second auxiliary coil are electrically connected to the valley voltage detector.

8. The DC to AC power conversion apparatus of claim 7, wherein when the first transformer or the second transformer outputs a secondary-side current to the AC output terminal and the secondary-side current decreases to a zero current, a first voltage signal of the first auxiliary coil or a second voltage signal of the second auxiliary coil generates the resonance voltage, and a valley voltage of the resonance voltage is less than a zero voltage.

9. The DC to AC power conversion apparatus of claim 8, wherein when the first voltage signal or the second voltage signal decreases to the zero voltage, the valley voltage detector detects the zero voltage to generate a turn-on signal while below the zero voltage, to turn on the first switching signal, the second switching signal, the third switching signal or the fourth switching signal.

10. The DC to AC power conversion apparatus of claim 9, wherein the control module further has a switching signal generator that is electrically connected to the AC waveform generator, the pulse-width modulation comparator and the valley voltage detector, and generates the first switching signal, the second switching signal, the third switching signal and the fourth switching signal based on the AC zero crossing detection signal, the turn-off signal and the turn-on signal.

11. The DC to AC power conversion apparatus of claim 10, wherein the switching signal generator has a synchronous-rectifier function that enables the first switching signal and the second switching signal to generate a corresponding high frequency switching synchronously or enables the third switching signal and the fourth switching signal to generate a corresponding high frequency switching synchronously.

12. The DC to AC power conversion apparatus of claim 1, wherein the first power conversion module further includes a first diode that is electrically connected in parallel with the second switching element, and the second power conversion module further includes a second diode that is electrically connected in parallel with the fourth switching element.

13. The DC to AC power conversion apparatus of claim 1 further comprises a front end DC/DC converter that has one end electrically connected to the DC input terminal and the other end electrically connected to the first power conversion module and the second power conversion module.

14. A DC to AC power conversion method, comprising:
determining whether an AC waveform generator operates in a grid connected mode;
enabling the AC waveform generator to generate an AC reference signal and an AC zero crossing detection signal based on grid connected power if the AC waveform generator operates in the grid connected mode, otherwise enabling the AC waveform generator to generate the AC reference signal and the AC zero crossing detection signal itself;
generating an error signal based on the AC reference signal and an output current or an output voltage at an AC output terminal;
generating a turn-off signal based on the error signal and an input at a DC input terminal;
detecting or predicting a valley voltage of a resonance voltage to generate a turn-on signal;
generating a first switching signal, a second switching signal, a third switching signal and a fourth switching signal based on the AC zero crossing detection signal, the turn-off signal and the turn-on signal; and
controlling a first switching element, a second switching element, a third switching element and a fourth switching element of a first power conversion module and a second power conversion module with the first switching signal, the second switching signal, the third switching signal and the fourth switching signal, so as to enable the first power conversion module and the second power conversion module to convert the input current at the DC input terminal to the output current at the AC output terminal.

15. The DC to AC power conversion method of claim 14 further comprises:
when the AC crossing zero detection signal is a high voltage, enabling the first switching signal to be high frequency switching, the second switching signal and the third switching signal to be turnoff, and the fourth switching signal to be turn-on; and
when the AC crossing zero detection signal is a low voltage, enabling the first switching signal and the fourth switching signal to be turn-off, the second switching signal to be turn-on and the third switching signal to be high frequency switching.

16. The DC to AC power conversion method of claim 14, wherein the turn-on signal is generated when a first voltage signal of a first auxiliary coil or a second voltage signal of a second auxiliary coil decreases zero voltage or below.

\* \* \* \* \*